INVENTOR
JERZY J. CZARNECKI

Oct. 21, 1969  J. J. CZARNECKI  3,473,729
COMPRESSOR SEAL OIL SYSTEM WITH POWER RECOVERY
Filed March 21, 1968  3 Sheets-Sheet 2

INVENTOR.
JERZY J. CZARNECKI
BY
ATTORNEYS

United States Patent Office
3,473,729
Patented Oct. 21, 1969

3,473,729
COMPRESSOR SEAL OIL SYSTEM WITH
POWER RECOVERY
Jerzy J. Czarnecki, Princeton, N.J., assignor to De Laval
Turbine Inc., Trenton, N.J., a corporation of Delaware
Filed Mar. 21, 1968, Ser. No. 714,998
Int. Cl. F04d 29/08
U.S. Cl. 230—204
4 Claims

ABSTRACT OF THE DISCLOSURE

A compressor seal oil system is provided involving power recovery by use of a variable displacement hydraulic motor receiving excess oil flow to aid an electric motor in driving a seal oil pump. Provision is made to control operation of the hydraulic motor to maintain the seal oil at a pressure having a fixed relationship to the delivery pressure of the compressor.

BACKGROUND OF THE INVENTION

Gas compressors frequently operate to provide pressures of the order of 3,000 to 5,000 pounds per square inch. A shaft of such a compressor extending from its high pressure side passes through a packing and bearing arrangement, the latter providing sealing against loss of gas. In order to maintain the seal and also to provide cooling of the shaft to protect the packing against the high temperatures occurring in the compressor it has been customary to provide oil under pressure to a seal oil chamber surrounding the shaft and located between flow-restricting packing of labyrinth type adjacent to the delivery region of the compressor and further packing surrounding the shaft where it passes from the casing and through a bearing. To avoid leakage of gas, the oil supplied to the chamber must be provided at a pressure exceeding that of the compressed gas, and conventionally the oil pressure in the chamber is around 10 to 15 pounds per square inch in excess of the gas pressure, so that any leakage is of oil flowing inwardly along the shaft. The total leakage of oil inwardly and outwardly may be of the order of 30 gallons per minute. In order to maintain the required pressure in the seal oil chamber, a flow in excess of the leakage is supplied to the chamber and flows outwardly therefrom through a throttling device to maintain the proper back pressure on the system. A throttling device so used, its discharge being to low pressure, involves a great loss of power because of the very high pressure drop even if the flow itself is maintained as low as possible consistent with abnormally high rates of leakage and consistent with the avoidance of insufficient pressure if the delivery gas pressure changes, there being ordinarily involved a fixed rate of oil flow sufficient to take care of any abnormal conditions.

SUMMARY OF THE INVENTION

In accordance with the present invention, a system is provided for recovery of a major part of the power which in prior systems would be lost as heat in the throttling system. In brief, the oil pump is driven by an electrical motor which is aided in driving the pump by an adjustable displacement hydraulic motor receiving the excess oil which is delivered to the seal oil chamber. A control is provided to vary the displacement of the hydraulic motor to maintain in the seal oil chamber a pressure having a substantially fixed differential value over the gas pressure. The shaft of the hydraulic motor is directly connected to the pump driving electric motor which operates at nearly constant speed, so that the power delivered by the hydraulic motor in aid of the electric motor varies with the displacement of the hydraulic motor.

The general objects of the invention relate to the attainment of this operation, and these and other objects relating to details of construction and operation will become apparent from the following description and the accompanying drawings.

DESCRIPTION OF THE PREFERRED EMBODIMENT

Figure 1:
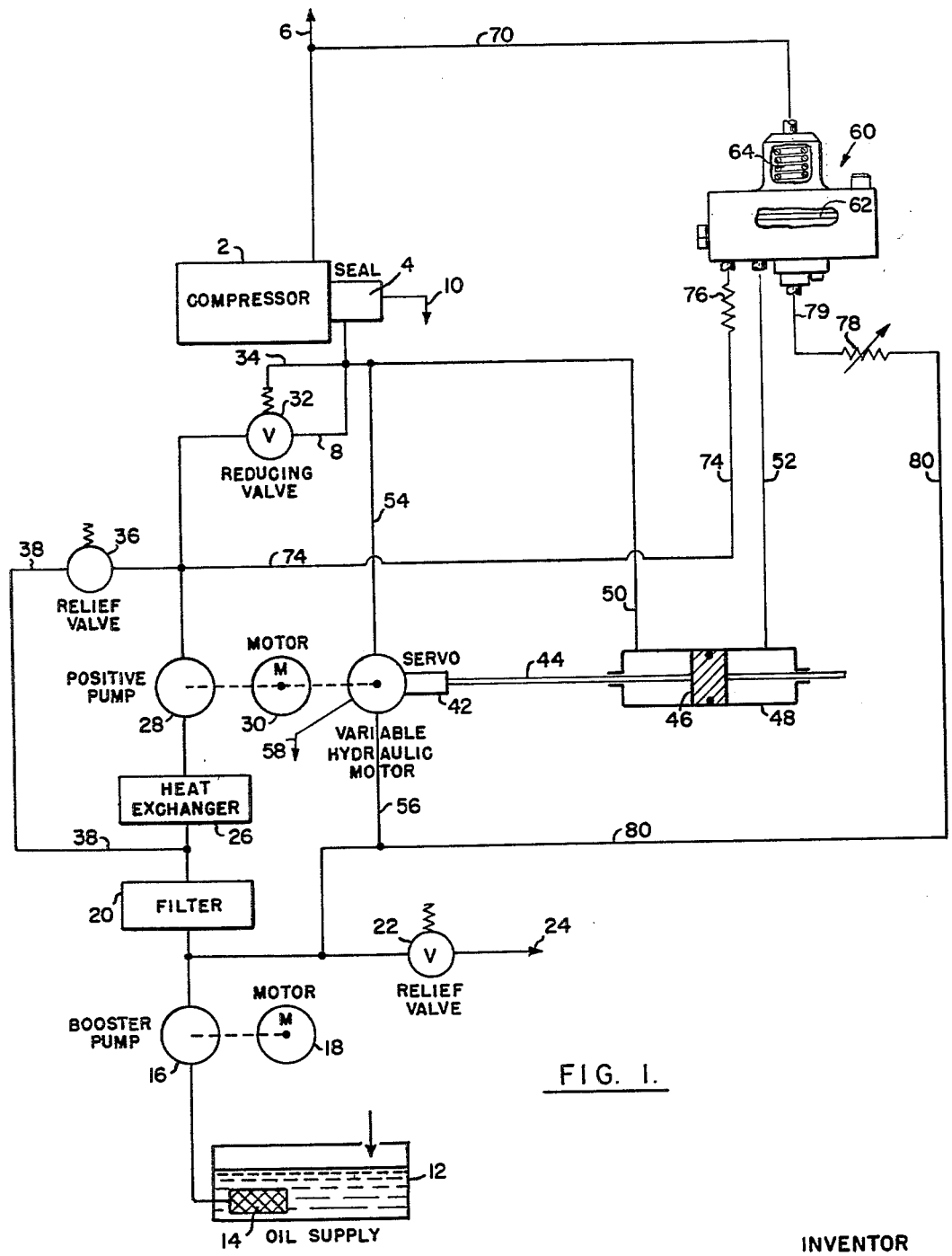
FIGURE 1 is a diagram illustrating the improved system.

Referring first to FIGURE 1, this shows primarily in block diagram or conventionalized the elements involved in the new system.

A gas compressor of conventional type is indicated at 2, and is not detailed since the system is applicable to compressors of many types which have, in common, a shaft carrying the moving elements which at one of its ends extends from the high pressure side of a casing through a sealing system and bearings as already indicated. The seal chamber of this compressor is indicated at 4 and surrounds the shaft between inner and outer packings. It is this seal chamber which is provided with oil at a pressure exceeding by a predetermined amount the pressure of the compressed gas. The outlet for the compressed gas is indicated at 6. Oil is provided to the seal chamber 4 through the connection 8. There is indicated at 10 the connection receiving leakage oil, which connection will usually be returned to the oil supply.

An oil supply tank is shown at 12 and from it oil is drawn through a strainer 14 by a booster pump 16 driven by a constant speed motor 18. The pump 16 delivers the oil, usually, through a filter 20. The discharge side of the pump 16 is shown as connected to a low pressure relief valve 22 having an adjustable control to set the maximum pressure at the input to the filter. If the relief valve opens its outflow at 24 may be returned to the supply tank 12. Beyond the filter the flow is ordinarily through a heat exchanger 26 to cool the oil prior to its entry into the main pump 28 which is driven by an electric motor 30. The pump 28 may be of any positive type capable of delivery at very high pressures. Such a pump may be of the "Imo" screw type or of a piston type such as a "Lucas" type operating under substantially constant displacement conditions. While this last requirement is not necessary, pumps delivering oil at the very high pressures involved, exceeding the output pressure are generally desirably of the constant displacement type, i.e. delivering a volume of oil substantially proportional to the shaft rotation. The pump 28 delivers the oil through a reducing valve 32 to the input connection 8 to the chamber 4. The reducing valve is desirably controlled by a connection 34 to the line 8. A high pressure relief valve, manually adjustable, is indicated at 36 to bypass oil from the output of the pump 28 in the event that a set pressure is exceeded, the bypassed oil, if any, being desirably delivered through the connection 38 to a point on the delivery side of the booster pump, for example between the filter and the heat exchanger as illustrated. What has been so far described is conventional and may, of course, be changed in accordance with particular requirements of a given system.

In conventional seal oil systems, excess oil delivered to the seal chamber 4 would pass through a throttling device capable of maintaining the back pressure in excess of what is required. Flow through such a throttling device represents a major loss of power dissipated as heat. It is this power loss which is minimized by power recovery in the present system.

In accordance with the present invention, a variable displacement hydraulic motor 40 has its output shaft connected to the electric motor 30 to aid the latter in driving the pump 28. This hydraulic motor 40 may be of the "Lucas" type involving pistons, the strokes of which are variable so that the ratio of piston displacement to shaft rotation may be adjusted. As is conventional with these pumps, a servo arrangement indicated at 42 changes the displacement-shaft rotation ratio under an input from a piston rod 44 driven either to the right or left by a piston 46 operating in a cylinder 48. This arrangement is conventionalized in FIGURE 1 but shown in structural form in FIGURE 3. Connections 50 and 52 supply oil to the ends of the cylinder 48 on opposite sides of the piston 46.

The connection 50 runs to the seal chamber 4. The connection 52 runs to a regulator supplying oil under controlled pressure.

Oil for driving the hydraulic motor 40 comes through the connection 54 from the line 8. Outflow from the hydraulic motor is through connection 56 to the low pressure release valve 22. A drain connection for leakage is indicated at 58.

Figure 2:
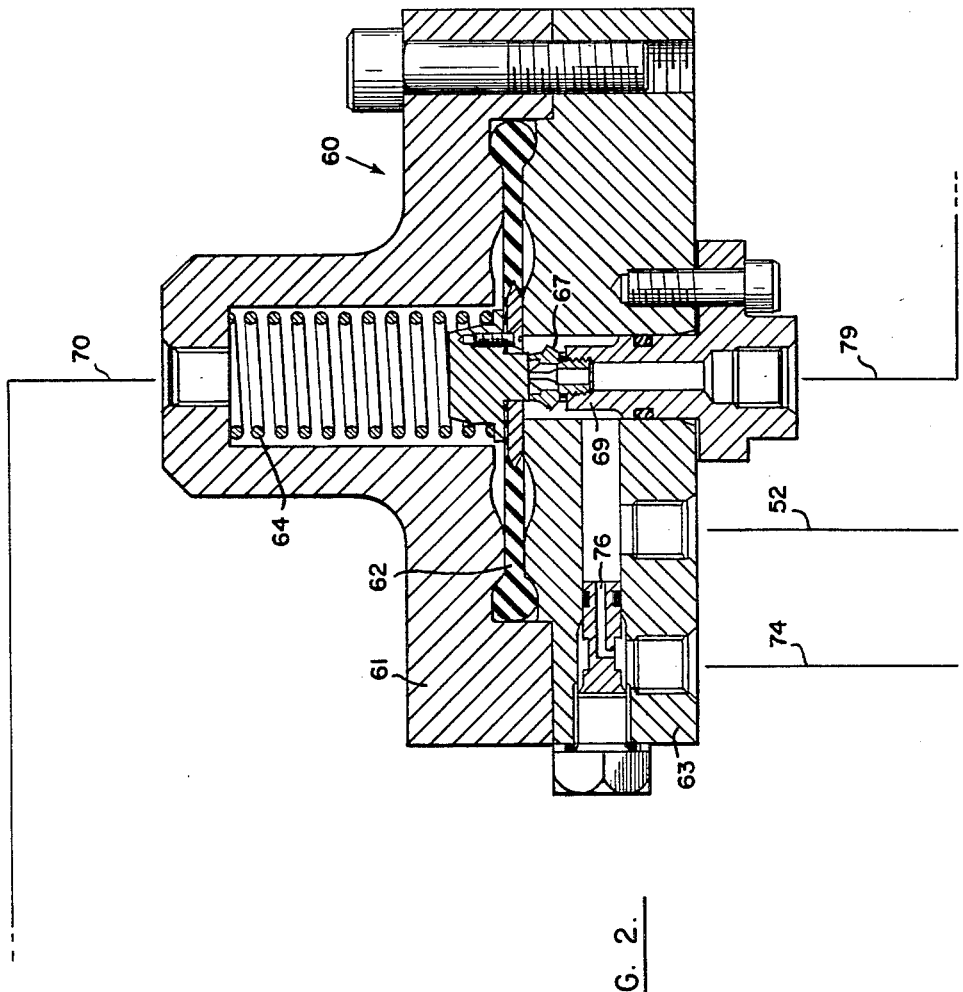
FIGURE 2 is a section of a differential pressure regulator which controls the displacement characteristics of the hydraulic motor.

The regulator diagrammed in FIGURE 1 and shown structurally in FIGURE 2 is designated 60. It comprises housing members 61 and 63 which clamp between them a flexible diaphragm assembly 62. A spring 64 urges the diaphragm 62 downwardly, the spring being chosen to provide a fixed pressure differential as will appear hereafter, though, if desired, provisions may be made to adjust the force exerted by the spring on the diaphragm to make the pressure differential adjustable. The lower side of the diaphragm assembly supports a valve member 67 which, when the diaphragm moves downwardly, closes off the upper end of a tube 69 secured in the lower housing member 63 and having a bore communicating with a waste line 79 which through a fluid resistance, desirably provided by an adjustable orifice, diagrammed at 78, communicates through connection 80 with the low pressure relief valve 22. The delivery pressure of the gas compressor is applied to the upper side of the diaphragm 62 through connection 70. An orifice 76 built into the controller 60 provides a resistance to oil flow, and receives oil from the connection 74 running to the outlet from the pump 28, the oil being thus supplied through the resistance to the region below the diaphragm 62 from which flow takes place through connection 52 to the cylinder 48.

Figure 3:
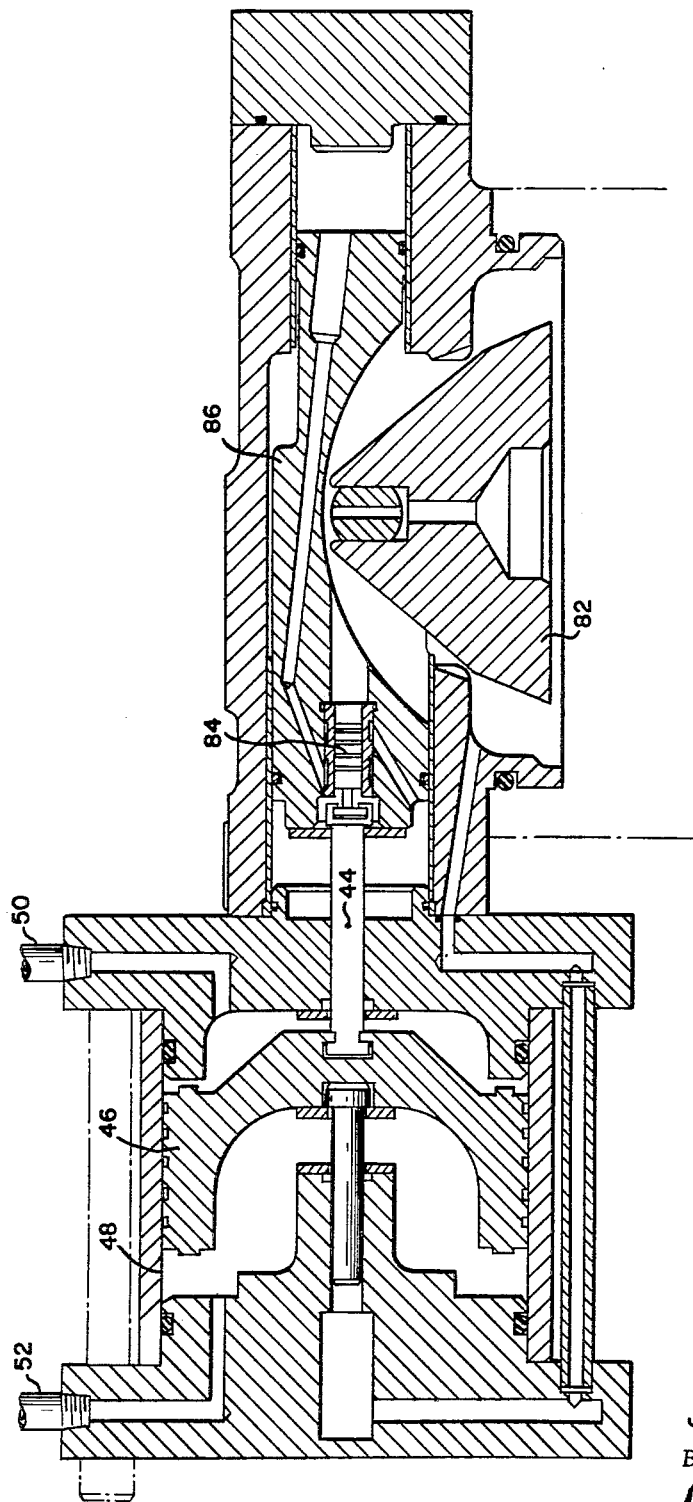
FIGURE 3 is a fragmentary section showing the means transforming hydraulic control to mechanical control of the variable displacement motor.

Details of the variable hydraulic motor 40 are conventional, and only so much of this motor is illustrated in FIGURE 3 as to show the nature of the control in connection with the servo arrangement. The rod 44 driven by the piston 46 operates the conventional pilot valve 84 in the servo system which through the moveable element 86 adjusts the angle of the cam 82 which controls movement of the motor pistons (not shown). Movement of piston 46 during operation is quite small and involves little power.

The operation of the system may be best understood by considering first the characteristics of the controller or regulator 60. As stated, the output pressure of the compressor is applied through connection 70 to the upper side of the diaphragm 62. The force thus supplied is augmented by that of the spring 64, and since the exposed upper and lower faces of the diaphragm are equal in area, it will be evident that the diaphgm will move upwardly only when the pressure beneath it exceeds the delivered gas pressure by an amount corresponding to the force of the spring 64 which, effectively, represents a pressure differential chosen as desired. In a typical operation this pressure differential is around 10 to 15 pounds per square inch. A slight upward movement of the diaphragm will result in opening the region below the diaphragm to the drain connection 79, the valve 67 being lifted. Downward movement of the diaphragm closes this valve. A very sensitive control of the pressure differential is achieved. Referring to FIGURE 1, the piston 46 is in equilibrium only when the pressure at its left-hand side equals the pressure at its right-hand side. The latter is that of the connection 52; the former is that of the seal chamber 4. The equilibrium condition, therefore, establishes a pressure in the seal chamber 4 which has a value exceeding the discharge pressure of the compressor by the chosen differential, referred to as about 10 to 15 pounds per square inch under ordinary conditions. The piston moves to the left or right depending on the difference of the pressures on its faces, and correspondingly moves the pilot valve of the servo 42 to control the displacement of the hydraulic motor 40. The hydraulic motor is accordingly effective to control the amount of oil bypassed to waste from the input connection to the seal chamber 4. Remembering that the hydraulic motor shaft will operate at the speed of the electric motor 30, which is substantially constant, if the pressure in the seal chamber 4 tends to rise above its proper level, the displacement of the hydraulic motor will increase, bypassing an increased amount of oil and, accordingly, in view of leakage from the seal will reduce the flow to the seal, maintaining the desired seal pressure within narrow limits, the result being due, of course, to the fact that the positive supply pump 28 provides a substantially constant flow of oil. On the other hand, if the seal pressure drops below the desired value, the displacement of the hydraulic motor is reduced.

This control of seal pressure at the desired value is not accompanied by the large losses resulting from prior systems, since the bypass of oil through the hydraulic motor provides a drive for the motor causing it to supply driving torque to the pump 28 relieving part of the burden which would ordinarily have to be assumed by the motor. The contribution of the hydraulic motor to the power required by the pump 28 means, of course, that less power is drawn from the motor supply lines, this being true irrespective of the nature of the motor.

Stated in another way, the hydraulic motor provides a back pressure of the desired value by bypassing part of the constant flow of oil to the seal chamber, the remainder of the oil flowing from the chamber as leakage, and the pressure is maintained irrespective of the quantity of leakage, and is further maintained at a value exceeding the compressor discharge pressure by a definite differential. The maintenance of the back pressure by the hydraulic motor is not attended by power dissipation as in the case of throttling, but instead the hydraulic motor lessens the required power input to the electric motor.

It will be evident that the system is not dependent upon the constant speed of the pump 28 and motor 30, though usually these would operate at a constant speed. It will be evident that various changes in details of the system may be made without departing from the invention as defined in the following claims.

I claim:

1. In combination with a compressor having a seal oil chamber surrounding a portion of the compressor shaft at the delivery end of the compressor, a pump supplying excess oil to said chamber, an electric motor driving said pump, a variable displacement hydraulic motor having an output shaft connected to said pump to aid the electric motor in drive thereof, means delivering excess oil from said pump to drive said hydraulic motor, and means responsive to variations between the pressure in said seal oil chamber and the pressure of gas delivered by the compressor to control the displacement of the hydraulic motor, thereby to maintain a predetermined relationship between the last mentioned pressures.

2. The combination of claim 1 in which the last mentioned means maintains substantially constant the difference between said last mentioned pressures.

3. The combination of claim 1 in which the pump delivers oil at a substantially constant rate.

4. The combination of claim 3 in which the last mentioned means maintains substantially constant the difference between said last mentioned pressures.

References Cited

UNITED STATES PATENTS 2,485,447  10/1949  Keller _____ 230—204 XR
2,660,367  11/1953  Ehlinger _____ 230—204

ROBERT H. WALKER, Primary Examiner